(12) United States Patent
Griffin et al.

(10) Patent No.: US 10,984,280 B2
(45) Date of Patent: Apr. 20, 2021

(54) SYSTEM AND METHOD FOR DETERMINING THE PRESENCE OF OBJECTS IN AN IMAGE

(71) Applicant: Emdalo Technologies Limited, County Clare (IE)

(72) Inventors: Ivan Griffin, Limerick (IE); David O'Reilly, County Clare (IE); John J. Guiry, County Waterford (IE)

(73) Assignee: EMDALO TECHNOLOGIES LIMITED

( * ) Notice: Subject to any disclaimer, the term of this patent is extended or adjusted under 35 U.S.C. 154(b) by 105 days.

(21) Appl. No.: 16/464,029

(22) PCT Filed: Nov. 24, 2017

(86) PCT No.: PCT/EP2017/080423
§ 371 (c)(1),
(2) Date: May 24, 2019

(87) PCT Pub. No.: WO2018/096122
PCT Pub. Date: May 31, 2018

(65) Prior Publication Data
US 2019/0325252 A1    Oct. 24, 2019

(30) Foreign Application Priority Data

Nov. 24, 2016    (GB) ..................................... 1619926

(51) Int. Cl.
*G06K 9/46*    (2006.01)
*G06K 9/62*    (2006.01)

(52) U.S. Cl.
CPC ......... *G06K 9/4642* (2013.01); *G06K 9/4609* (2013.01); *G06K 9/6269* (2013.01)

(58) Field of Classification Search
CPC .. G06K 9/4642; G06K 9/4609; G06K 9/6269; G06K 9/6285; G06K 7/10
See application file for complete search history.

(56) References Cited

U.S. PATENT DOCUMENTS

2015/0371115 A1* 12/2015 Marchisio ............ G06K 9/4604
382/159

OTHER PUBLICATIONS

Felzenszwalb P F, et al: "Object Detection with Discriminatively Trained Part-Based Models", IEEE Transactions on Pattern Analysis and Machine Intelligence, IEEE Computer Society, USA, vol. 32, No. 9, Sep. 1, 2018 (Sep. 1, 2010), pp. 1627-1645, XP011327422, ISSN: 0162-8828, DOI: 10.1109/TPAMI.2009.167, Sections 1, 2, 3, 4; p. 1627-1632, p. 1633; figure 4, Section 6; p. 1637-1638.

(Continued)

*Primary Examiner* — Diane D Mizrahi
(74) *Attorney, Agent, or Firm* — Tarolli, Sundheim, Covell & Tummino LLP

(57) ABSTRACT

The present invention relates to a system and method for determining the presence of objects in an image.
The techniques used process pixel data within the image by a relatively small number of pixel rows at a time. The angle and magnitude date from the pixels within an image are redistributed into a plurality histogram of magnitude bins associated with groupings of pixels. Once enough groupings of pixels equivalent to the height of a Block worth of pixels have been made, partial Support Vector Machine (SVM) calculations are performed on that Block worth of pixels. This is repeated until there are sufficient partial results equivalent to the height of the feature window, and then a full SVM calculation is performed. This process then may be used to scan across the whole image to determine the presence of objects within it.

34 Claims, 6 Drawing Sheets

(56) References Cited

OTHER PUBLICATIONS

Ross Girshick: "Deformable part models", Lecture Apr. 16, 2013, XP055469957, Retrieved from the Internet: URL: http://vision.stanford.edu/teaching/cs231b_spring1213/slides/dpm-slides-ross-girshick.pdf.
Dalal N, et al: "histograms of Oriented Gradients for Human Detection", Proceedings/ 2005 IEEE Computer Society Conference on Computer Vision and Pattern Recognition, CVPR 2005: [Jun. 20-25, 2005, San Diego, CA], IEEE; Piscataway, NJ, USA, vol. 1, Jun. 20, 2005, pp. 886-893, XP010817365, DOI: 10.1109/CVPR.2005.177, ISBN: 978-0-7695-2372-9.
International Search Report for PCT/EP2017/080423 dated Jun. 4, 2016.
International Written Opinion for PCT/EP2017/080423 dated Jun. 4, 2016.

\* cited by examiner

SYSTEM AND METHOD FOR DETERMINING THE PRESENCE OF OBJECTS IN AN IMAGE

RELATED APPLICATIONS

The present invention is a U.S. National Stage under 35 USC 371 patent application, claiming priority to Serial No. PCT/EP2017/080423, filed on 24 Nov. 2017; which claims priority of GB 1619926.7, filed on 24 Nov. 2016, the entirety of both of which are incorporated herein by reference.

FIELD OF THE INVENTION

The invention relates generally to computer vision and more specifically a system and method for determining the presence of objects in an image. The present invention is particularly suited to low power system for determining the presence of objects (for example humans or objects in an image acquired by a camera), for example embedded systems and embedded processors.

BACKGROUND OF THE INVENTION

The field of computer vision often requires that classifiers are trained to detect faces, people, etc, with a view to enabling applications that interact with people and real-world objects.

A histogram of oriented gradients (HoG) is a feature descriptor used in a variety of computer vision and image processing applications, for the purposes of object detection. The use of HoG descriptors has been a particularly successful technique in detecting, among other things, humans, animals, faces, and text. For example, an object detection system can be configured to generate HoG descriptors that describe features of objects in an input image. The system can also be configured to compare the generated HoG descriptors against a database of HoG descriptors, corresponding to known objects, to determine whether any of the known objects is present in the input image.

The reasons that HoG is used in these applications are that it enables robust detection in the presence of local rotations, it is scaling and variations in terms of lighting conditions etc. and it allows a compact reference descriptor to be used to describe an object template for comparison with HoG descriptors computed from an incoming video-stream from a camera or other device.

When first introduced the use of HOG feature descriptors brought about a significant improvement in the state of the art in object detection. This improvement in accuracy was accompanied by a large increase in the computational burden, which was an impediment to its adoption in resource-constrained embedded solutions.

We have therefore appreciated the need for an improved technique for determining the presence of an object in an image, for example a technique that have a lower computational burden.

SUMMARY OF THE INVENTION

The present invention provides a method of determining the presence of objects in an image, comprising: receiving image pixel data comprising pixel values for a plurality of pixels in an image, where the image has x pixel rows and y pixel columns; applying an edge filter to the received image pixel data to generate angle and magnitude data for each pixel within the image; for each of n pixel rows by y pixel columns of the image, where n<x, redistributing the angle and magnitude data for the n pixel rows by y pixel columns to create a plurality of groups of histogram of magnitude bins across the width of the image; for each of m lots of n pixel rows of groups of histogram of magnitude bins, performing a partial Support Vector Machine (SVM) calculation based on the plurality of groups of histogram of magnitude bins, where m represents the number of n pixel rows in a Block of pixels; repeating the steps of redistribution and performing partial SVM calculations until there are j Block rows of partial SVM calculations, where j Block rows of pixels represents the number of Block rows of pixels in a feature window used to represent the object to be detected; performing a full SVM calculation using the j Block rows of partial SVM calculations to generate a HOG descriptor; and determining the presence of an object in the image based on the HOG descriptor.

The techniques used process pixel data within the image by a relatively small number of pixel rows at a time (rather than requiring the entire frame to be available for processing at the one time). The angle and magnitude date from the pixels within an image are redistributed into a plurality histogram of magnitude bins associated with groupings of pixels. Once enough groupings of pixels equivalent to the height of a Block worth of pixels have been made, partial Support Vector Machine (SVM) calculations are performed on that Block worth of pixels. This is repeated until there are sufficient partial results equivalent to the height (in Blocks) of the feature window (used to detect an object within the image), and then a full SVM calculation is performed based on the partial SVM calculations within that window. This process then may be used to scan across the whole image to determine the presence of objects within it.

In the present invention, pixel data from the current input scale is fed into the HoG pipeline n lines at a time (where n is a number of pixels that is less than the width of the image in pixels), rather than requiring the entire frame to be available for processing at the one time. This significant reduces the amount of working memory any processing elements in the system need to be capable of dealing with.

Within the method, redistributing the angle and magnitude data for the n pixel rows by y pixel columns comprises: redistributing the angle and magnitude data into a plurality of histogram of magnitude bins across the width of the image, each of the plurality of histogram of magnitude bins representing the histogram of magnitude bins of a Brick worth of pixels; redistributing the plurality Brick histogram of magnitude bins into a plurality of Slab histogram of magnitude bins across the width of the image, where each Slab histogram of magnitude bins comprises the histogram of magnitude bins of two adjacent Brick worth of pixels in the same row. Each adjacent Slab worth of pixels in the same row of n pixel rows may be overlapped with an adjacent Slab worth of pixel by a Brick worth of pixels.

The method may also comprise: redistributing the plurality of Slab histogram of magnitude bins into a plurality of Block histogram of magnitude bins across the width of the image, where each Block histogram of magnitude bins comprises a concatenation of the histogram of magnitude bins of eight Slabs in a 4×2 configuration, each Block comprising m lots of n pixel rows. The concatenated histogram of magnitude bins may comprise the concatenation of four groups of histogram of magnitude bins, each of the four groups of histogram of magnitude bins comprising a combination of the histogram of magnitude bins of two neighbouring Slabs within the eight Slabs in a 2×1 configuration.

Alternatively, the method may comprise: redistributing the plurality of Slab histogram of magnitude bins into a plurality of Cell histogram of magnitude bins across the width of the image, where each Cell histogram of magnitude bins comprises the histogram of magnitude bins of four neighbouring Slabs in a 2×2 configuration, each Cell comprising 2n pixel rows.

In this alternative, the method may comprise: arranging the plurality of Cell histogram of magnitude bins into a plurality of Block histogram of magnitude bins across the width of the image, where each Block histogram of magnitude bins comprises a concatenation of the histogram of magnitude bins of four neighbouring Cells in a 2×2 configuration, each Block comprising m lots of n pixel rows.

In this alternative, redistributing the plurality Brick histogram of magnitude bins into a plurality of Slab histogram of magnitude bins across the width of the image may comprise: generating two planes of a plurality of Slab histogram of magnitude bins across the width of the image, where a first plane comprises the histogram of magnitude bins of first set of neighbouring Brick worth of pixels in the same row, and a second plane comprises the histogram of magnitude bins of second set of neighbouring Brick worth of pixels in the same row, where the first plane and second plane are offset from each other by a Brick worth of pixels. Redistributing the plurality of Slab histogram of magnitude bins into a plurality of Cell histogram of magnitude bins across the width of the image may comprise: redistributing the plurality of Slab histogram of magnitude bins of each plane into a plurality of Cell histogram of magnitude bins in each respective plane across the width of the image, where each Cell histogram of magnitude bins in each plane comprises the histogram of magnitude bins of four Slabs in a 2×2 in the respective plane, each Cell comprising 2n pixel rows.

Arranging the plurality of Cell histogram of magnitude bins into a plurality of Block histogram of magnitude bins across the width of the image may comprise: arranging the plurality of Cell histogram of magnitude bins of each plane into a plurality of Block histogram of magnitude bins in each respective plane across the width of the image by concatenating the histogram of magnitude bins of four Cells in each plane in a 2×2 configuration in the respective plane, each Block comprising m lots of n pixel rows.

Redistributing the plurality of Slab histogram of magnitude bins into a plurality of Block histogram of magnitude bins across the width of the image may comprise: redistributing the plurality of Slab histogram of magnitude bins of each plane into a plurality of Block histogram of magnitude bins in each plane across the width of the image, where each Block histogram of magnitude bins in each respective plane comprises a concatenation of the histogram of magnitude bins of eight Slabs in the respective plane in a 4×2 configuration, each Block comprising m lots of n pixel rows. The concatenated histogram of magnitude bins comprises the concatenation of four groups of histogram of magnitude bins in each respective plane, each of the four groups of histogram of magnitude bins in each respective plane comprising a combination of the histogram of magnitude bins of two neighbouring Slabs within the eight Slabs in a 2×1 configuration.

Performing a partial SVM calculation may comprise performing the partial SVM calculation on each Block of pixels in each of the planes, and wherein performing a full SVM calculation using the j Block rows of partial SVM calculations to generate a HOG descriptor comprises performing a full SVM calculation using the partial SVM calculations in each of the planes.

In summary, the method may redistribute the data into Bricks, Slabs and Cells before concatenating into Blocks, or this method may go from Bricks to Slabs and straight to Blocks without the need for the steps of redistributing into Cells in the interim. These steps may be performed on the data in a single plane, or in multiple planes.

The partial SVM calculation is performed in the first m lot of n pixel rows, and subsequent partial SVM calculations for the remaining m lot of n pixel rows in the j Block rows are only performed if the calculated partial SVM value for the preceding m lot of n pixel rows is greater than a threshold value.

Advantageously, this provides a fast-rejection method, in which processing of sections of the image are not performed if it is ascertained that data is unlikely to fall within the window concerned. This increases the speed at which the image can be processed.

The threshold value is dependent on the position of the m lot of n pixel rows within the j Block rows of the feature window. The threshold value is dependent on an average of a maximum and minimum partial SVM value for a m lot of n pixels rows. The maximum partial SVM values are based on a maximum partial SVM value across a plurality of negative training images, and the minimum partial SVM values are based on a minimum partial SVM value across a plurality of positive training images. The threshold value may comprise a scaling factor.

In the above methods, the partial SVM calculations are stored in a partial SVM buffer. The partial SVM buffer may be capable of storing the partial SVM calculations for j Block rows of pixels by y pixel columns.

In the above methods, performing a full SVM calculation may comprise summing the respective partial SVM calculations.

The methods may comprise rescaling the image prior to applying an edge filter. They may also comprise transposing the image prior to applying an edge filter such that the image comprises more rows of pixels than columns of pixels.

The method may be repeated for all of the pixel rows in the image.

The present invention also provides a processor for determining the presence of objects in an image, comprising: an input for receiving image pixel data comprising pixel values for a plurality of pixels in an image, where the image has x pixel rows and y pixel columns; and an output for outputting a determination of the presence of an object in the image. The processor may be configured to perform any or all of the method steps described above, whether alone or in combination, in order to determine the presence of an object in the image based on the HOG descriptor and output the determination of the presence of an object in the image.

The processor may be coupled to a buffer, and wherein the partial SVM calculations are stored in the buffer. The buffer may be capable of storing the partial SVM calculations for j Block rows of pixels by y pixel columns. The buffer may be internal to the processor, or external to the processor.

The processor may be configured to rescale the image. The processor may be configured to transpose the image.

The processor may be an embedded processor.

In all of the above, the following values may be used: n=4, m=4 and j=15.

LIST OF FIGURES

The present invention will now be described, by way of example only, and with reference to the accompanying drawings, in which.

Figure 5:
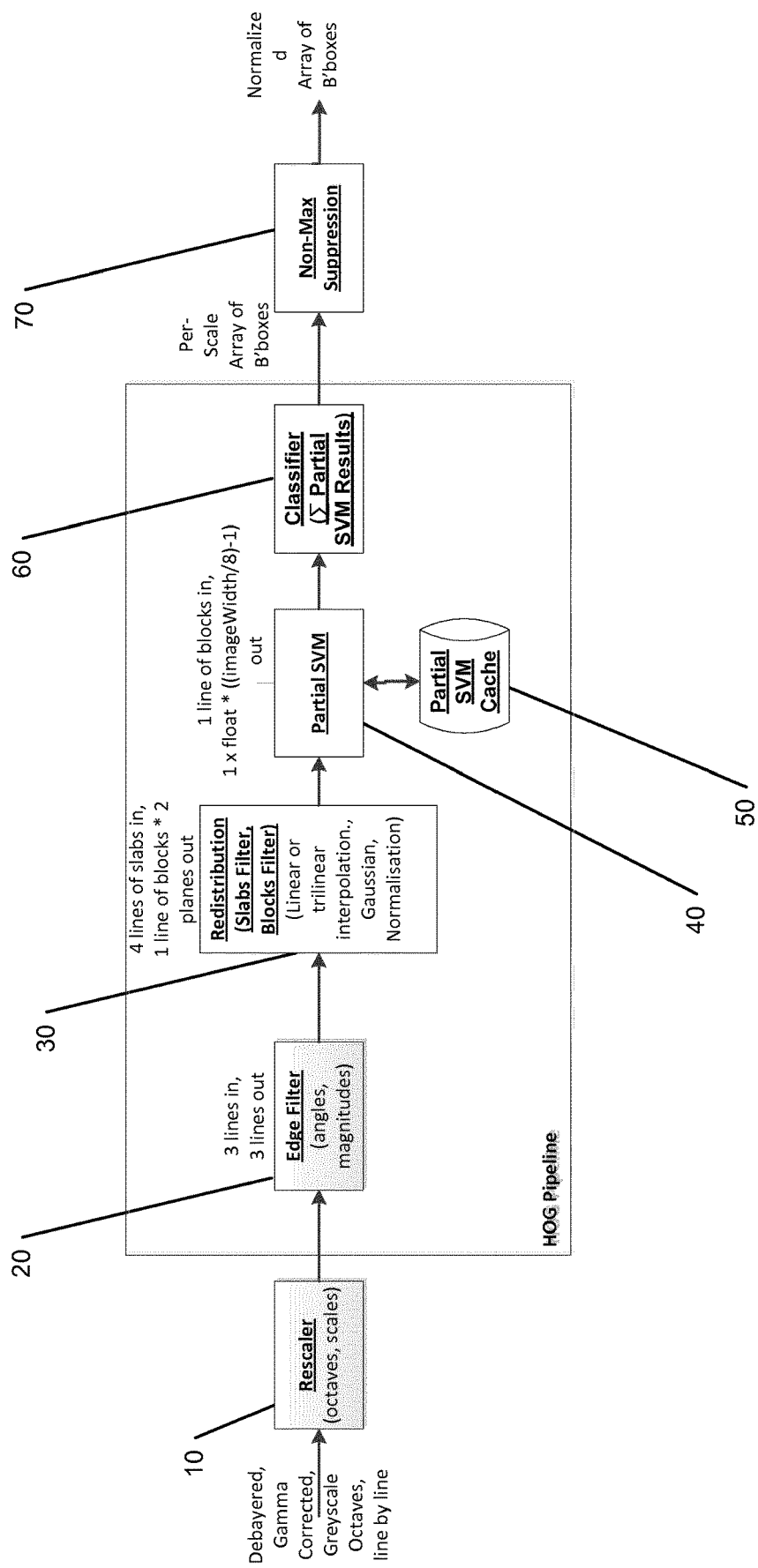
Figure 6:
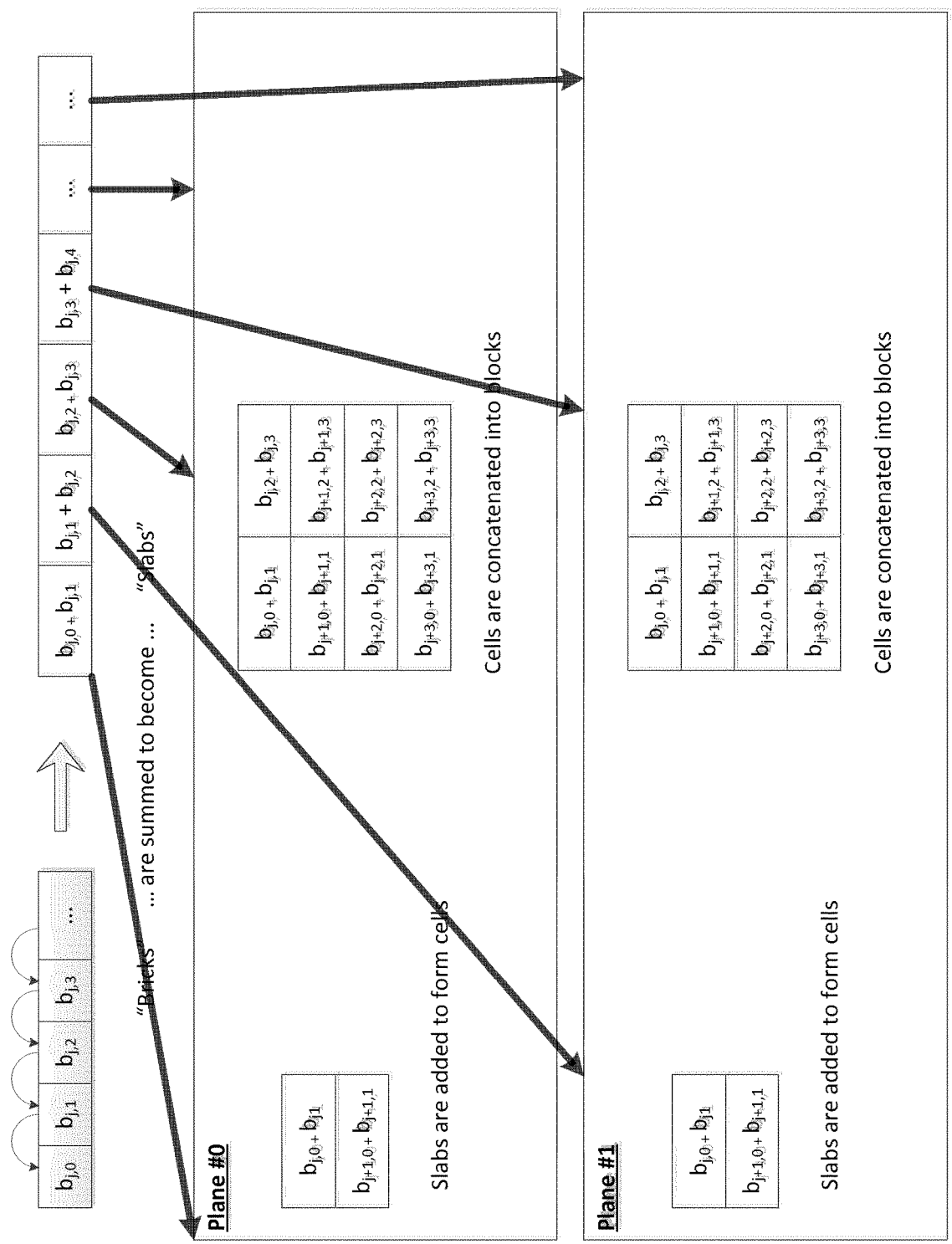

FIG. 5, which shows a simplified system diagram;

FIG. 6 shows the generation of Slabs from a plurality of Bricks;

DETAILED DESCRIPTION OF THE PREFERRED EMBODIMENTS

In brief, the present invention provides a method and system or processor for determining the presence of an object in an image. The techniques used process pixel data within the image by a relatively small number of pixel rows at a time (rather than requiring the entire frame to be available for processing at the one time). The angle and magnitude date from the pixels within an image are redistributed into a plurality histogram of magnitude bins associated with groupings of pixels. Once enough groupings of pixels equivalent to the height of a Block worth of pixels have been made, partial Support Vector Machine (SVM) calculations are performed on that Block worth of pixels. This is repeated until there are sufficient partial results equivalent to the height (in Blocks) of the feature window (used to detect an object within the image), and then a full SVM calculation is performed based on the partial SVM calculations within that window. This process then may be used to scan across the whole image to determine the presence of objects within it.

Before we go on to describe the techniques used in the present invention, we will give some background into known techniques for determining the presence of objects within images.

Figure 1:
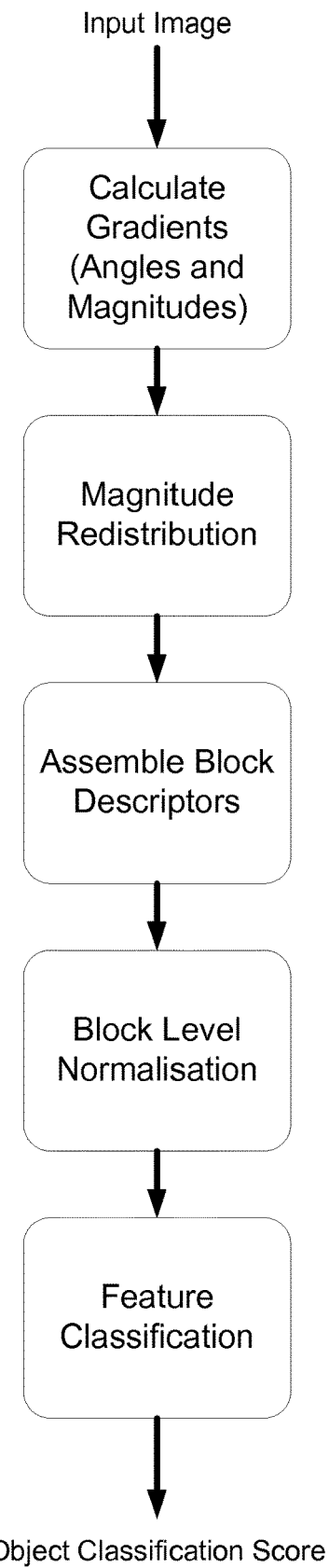
FIG. 1 shows known high level HoG-Support Vector Machine Processing Stages.

The general steps required to compute a HoG descriptor and convert to a classification score are shown FIG. 1 and consist of the following:

Gradient computation: A 1-D centred, point discrete derivative mask is applied in one or both of the horizontal and vertical directions, multiplying color or intensity data of image with the following filter kernels: $[-1,0,1]$ and $[-1,0,1]^T$.

Orientation binning: Bin pixel vote-weights into 9 histogram bins (covering 0 to 180 or 0 to 360 degrees). The weight, or pixel contribution, can either be the gradient magnitude itself, or some function of the magnitude; in actual tests the gradient magnitude itself generally produces the best results. Other options for the weight could include the square root or square of the gradient magnitude, or some clipped version of the magnitude.

Descriptor blocks: To account for changes in illumination and contrast, gradient strengths are locally normalized, by grouping cells together into larger, spatially connected blocks. The HOG descriptor is then the vector of the components of the normalized cell histograms from all of the block regions. These blocks typically overlap, meaning that each cell contributes more than once to the final descriptor. Two main block geometries exist: rectangular R-HoG blocks and circular C-HoG blocks.

R-HoG blocks are generally square grids, represented by three parameters: the number of cells per block, the number of pixels per cell, and the number of channels per cell histogram and R-HoG blocks appear quite similar to the SIFT descriptors. There is a minor improvement in performance could by applying a Gaussian spatial window within each block before tabulating histogram votes.

Block normalization: there are a number of different algorithms typically applied to normalize histograms at the block level, including L2-norm, L2-Hysteresis, L1-Square Root, and L1-norm.

Classifier: The descriptors are finally fed into a recognition system based on a pre-trained classifier, most commonly a Support Vector Machine (SVM).

Figure 2:
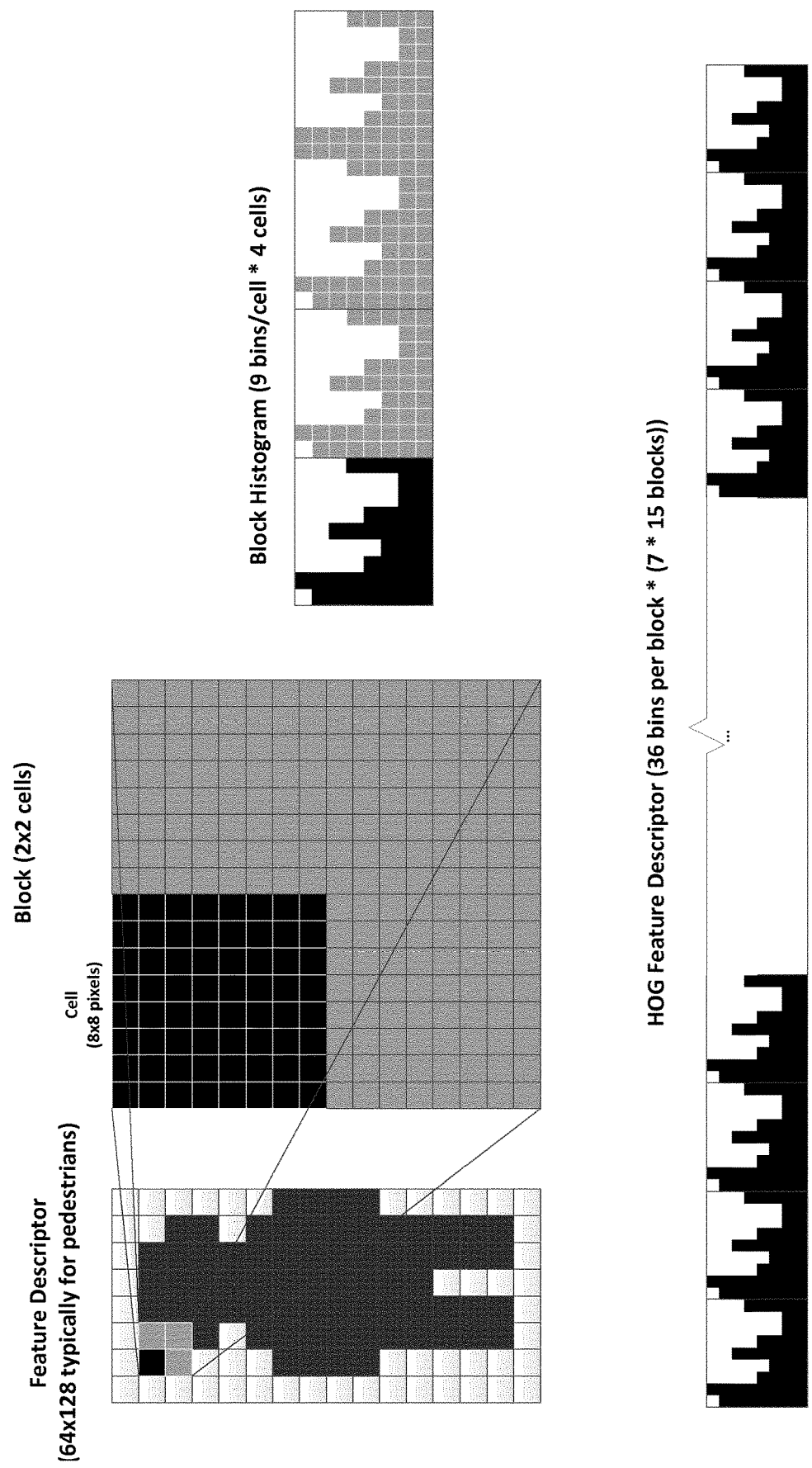
FIG. 2 illustrates the known HoG process.
Figure 3:
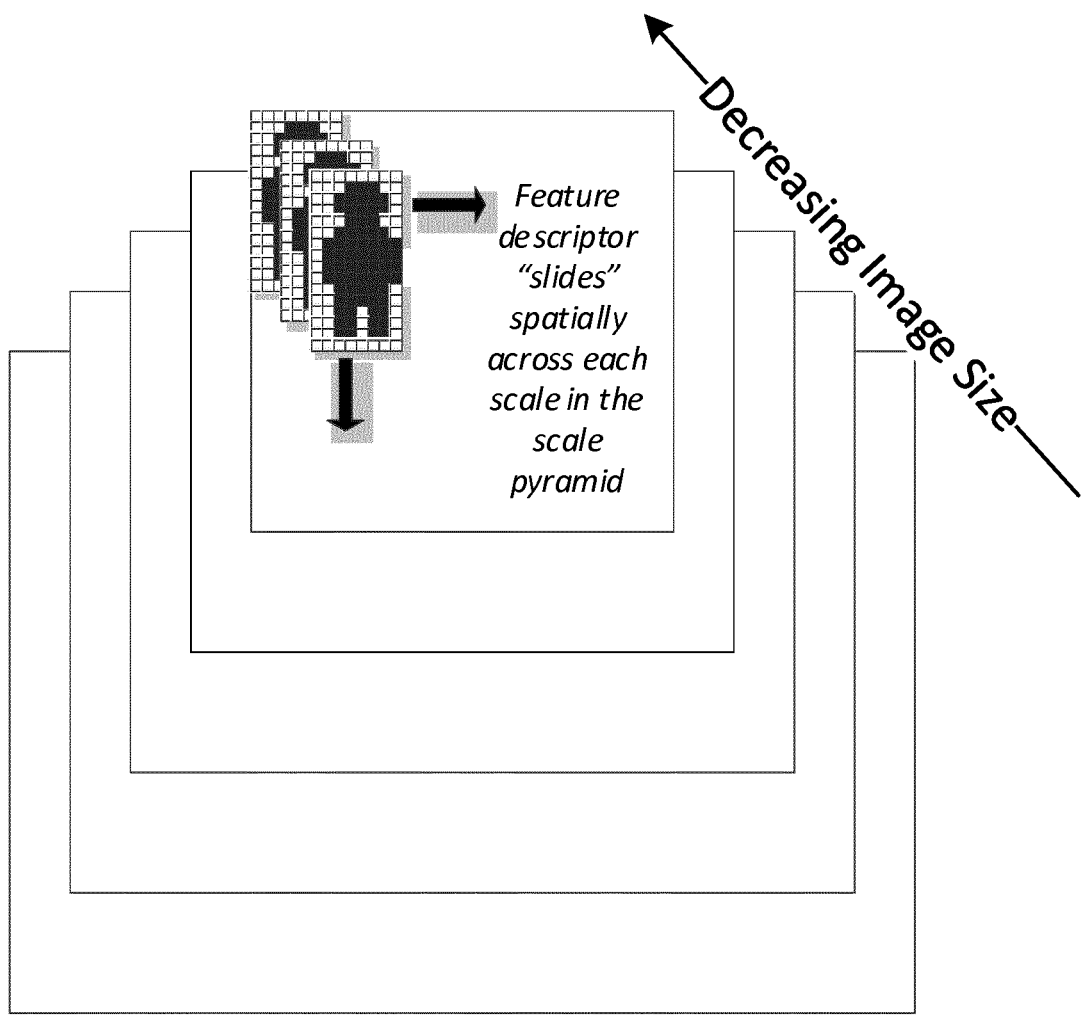
FIG. 3 illustrates the known scale-space pyramid for the process of FIG. 2.

FIGS. 2 and 3 further illustrate the process.

This HoG computation is traditionally performed by repeatedly stepping a window of say 64 pixels wide by 128 pixels high across a source image frame and computing the HoG descriptor as outlined in the previous section. As the HoG calculation contains no intrinsic sense of scale and objects can occur at multiple scales within an image, the HoG calculation is stepped and repeated across each level of a scale pyramid. The scaling factor between each level in the scale pyramid is commonly between 1.05 and 1.2 and the image is repeatedly down-scaled until the scaled source frame can no longer accommodate a complete HoG window as shown in FIG. 3.

Coarse spatial sampling, fine orientation sampling, and strong local photometric normalization permits the individual body movement of pedestrians to be ignored to a degree, so long as they maintain a roughly upright position. The HoG descriptor is thus particularly suited for human detection in images.

The computational cost of calculating a HoG descriptor is very high. The computation contains numerous costly mathematical functions including square-roots, divisions and arctangents which take many cycles to implement on a processor in software as well as large numbers of more common operations like additions and multiplications with each executing in as little as one clock cycle. The computational costs are compounded by the fact that performing a brute-force search by stepping a HoG template for comparison over the entire image is even more computationally expensive depending on the resolution of the input image. Furthermore, in scenarios where objects may be seen at a range of distances, it is necessary to search candidate windows of different sizes, further increasing the computational cost.

The high computational cost for computing a HoG descriptor can be a significant bottleneck in a variety of computer vision and image processing applications because these applications generally compute HoG descriptors for various positions in an image and for a variety of Region of Interest (ROI) sizes to account for scaling effects. Therefore, the use of HoG descriptors has been generally limited to high performance computing systems.

We will now describe the techniques used according to the present invention.

We first introduce some terminology in order to describe our invention in detail.

We introduce the terms "Brick", "Slab", "Cell" and "Block" in order to describe the processing units of histograms.

A "Brick" is the smallest individual processing unit of histograms, and it makes performance sense to make this equal to the spatial step size. We take 4 pixels to be the fundamental spatial stride for our detector, and make this the size of our basic building unit—the "Brick". A Brick is thus an arrangement of 4×4 pixels.

A "Slab" is an arrangement of 1×2 "Bricks".

A "Cell" is a 2×2 arrangement of "Bricks" (8×8 pixels), or a 2×1 arrangement of "Slabs".

A "Block" is an arrangement of 2×2 Cells (thus 16×16 pixels), or 4×2 arrangement of "Slabs"

Although the actual sizes and relationships between these terms can vary, we present one exemplary configuration here.

A feature descriptor can then be any rectangular configuration of blocks.

Each "Block" worth of pixels is turned into a "Block" worth of concatenated cell histogram of magnitude bins. The number of magnitude bins per Brick, Slab and Cell can vary, but for the purposes of example, we will consider each of the Brick, Slab and Cell worth of pixels to comprise 8 magnitude bins, representing unsigned angles of between 0 and 180 degrees. Signed angles are also possible.

The present invention can form part of a traditional image processing pipeline, which takes in raw sensor data from the camera, converts it to image pixel data, generates HoG descriptors, and calculates SVM classification scores. This can be done using a single processor, or multiple processing units within it. If multiple units are available, certain operations can be scheduled to run in parallel.

The system can have a number of discrete memories available to the individual processing elements (caches, local memory, etc.) such that the individual processing units are able to execute without contention or competing with each other for system resources (DMA channels, common memory bandwidth, etc.)

In the present invention, pixel data from the current input scale is fed into the HoG pipeline line-by-line, rather than requiring the entire frame to be available for processing at the one time. This significant reduces the amount of working memory any processing elements in the system need to be capable of dealing with.

The pipeline is specifically designed such that the input image scale can be sub-divided into horizontal slices and farmed out across a number of parallel processing elements, with the final SVM filter collating overall classification results.

In addition to farming out portions of the current input scale, it is also possible to farm out regions within the image to different parallel processing elements for concurrent processing. This is especially true once the scale size is small enough to fit within cache or local memory of an individual processing unit.

Figure 4:
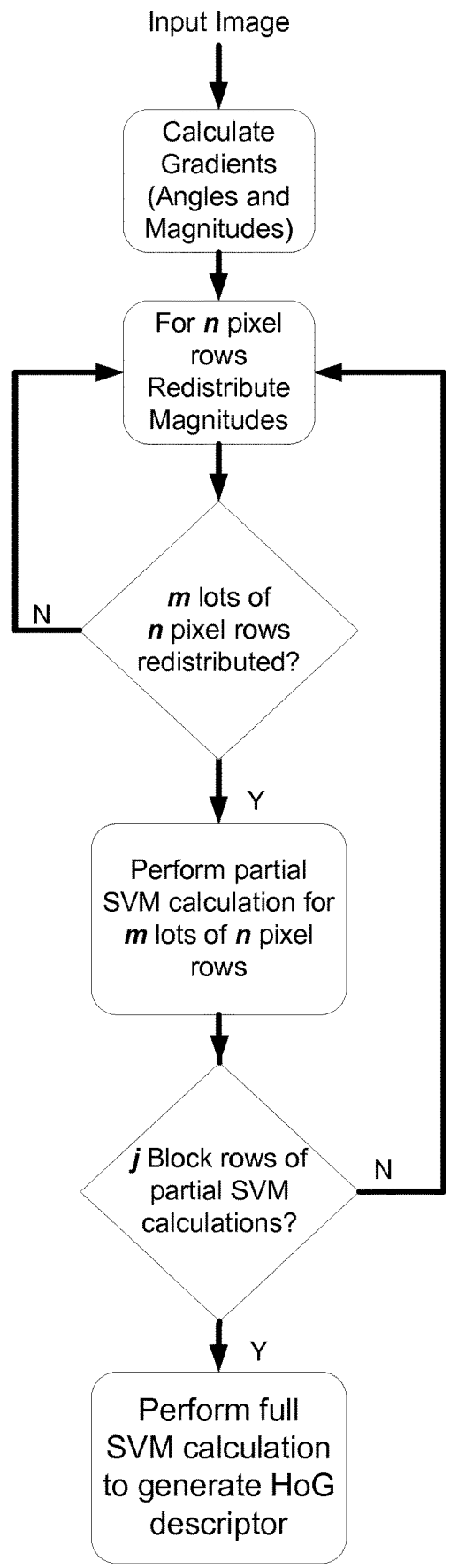
FIG. 4 represents a simplified method steps of the present invention.

FIG. 4 summarises the broad principles of the process of the present invention using a flow diagram. We will briefly summarise the process, and then go into more detail in each of the steps.

The method of determining the presence of objects in an image starts with receiving an input image, where the input image comprises pixel data, that is pixel values for a plurality of pixels in the image. The image can be of any dimension, but for the sake of an example, the image has x pixel rows and y pixel columns.

The gradients (angles and magnitude) are calculated for each pixel using an edge filter or like process. The output of this stage is angle and magnitude data for each pixel within the image.

For each of n pixel rows by y pixel columns of the image (where n<x) the angle and magnitude data for the n pixel rows by y pixel columns are redistributed to create a plurality of groups of histogram of magnitude bins across the width of the image. As discussed above, instead of processing the image in one go for the whole image, the present invention processes n pixel rows for the whole width of the image (y pixel columns) at a time.

Any number of rows can be chosen for n pixel rows, so long as where n<x. When n is chosen, for example, to be 4, then n pixel rows is the same height (in pixel rows) as a Brick (according to the above definition). In this case, the plurality of groups of histogram of magnitude bins across the width of the image is a plurality of Bricks worth of pixels (for example 4×4 pixels per Brick).

The process continues redistributing the angle and magnitude data for n pixel rows by y pixel columns until there are m lots of n pixel rows of groups of histogram of magnitude bins.

Again, any number of m lots of n pixel rows can be chosen. In this case, the m lots of n pixel rows is chosen to be the same height as a Block row of pixels. That is, if n is 4, m is 4 (i.e. the number of Brick rows in the height of a Block, that is 16 pixel rows).

For each of m lots of n pixel rows of groups of histogram of magnitude bins, a partial Support Vector Machine (SVM) calculation is performed based on the plurality of groups of histogram of magnitude bins. Thus, across the width of the image for a Block row of pixels (i.e. 16 pixel rows in this example), partial SVM calculations are performed across the width of the image based on the histogram of magnitude bins in each of the Blocks. These partial SVM calculations are stored for later use.

The above steps of redistributing the angle and magnitude data for n pixel rows by y pixel columns at a time, and performing partial SVM calculations on each m lots of n pixel rows of groups of histogram of magnitude bins are repeated until there are j Block rows of partial SVM calculations.

j Block rows of pixels represents the number of Block rows of pixels in a feature window used to represent the object to be detected. In this case, where if n is 4 and m is 4 (i.e. the number of Brick rows in the height of a Block, that is 16 pixel rows), j is 15, that is the feature window is 15 Blocks high.

Of course, these numbers are purely for example. It would be apparent that other combination of number of pixel rows and heights of Blocks and the number of Block rows in the feature window could be different.

Once the partial SVM calculations for the number of pixel rows equivalent in height to the number of Block rows in the feature window have been performed, the process then performs a full SVM calculation using the j Block rows of partial SVM calculations to generate a HoG descriptor. This HoG descriptor can then be used to determine the presence of an object in the image based on that HoG descriptor.

The above steps will now be described in more detail with reference to FIG. 5, which shows a simplified system diagram.

Input Image

The system of the present invention may be designed such that the input image has already been scaled appropriately. However, the system may be configured to do that rescaling itself (represented by a rescaler 10 in FIG. 5). Images are preferably resized using octaves (integer divisions from the original image, which avoid rounding error) and scales. As partial resizes of the image, scales are generated from the nearest octave and incur rounding error.

Whichever option is used, the image is passed to an edge filter 20 to determine the angles and magnitudes of the image gradients. Preferably the edge filter 20 receives and operates on 3 lines in, and outputs 3 lines at a time.

Edge Filter

The edge filter 20 determines the appropriate angles and magnitudes for the current pixel being processed.

The edge filter 20 may use hardware acceleration of the bilinear (within a "Cell") or trilinear distribution (across "Cells" within a "Block") into histogram bins of the angle and magnitude for the current pixel being processed.

The edge operator 20 may also use a software-generated look-up table (LUT) cache (in volatile or non-volatile memory) for the bilinear or trilinear distribution into "Brick"/"Cell" histogram bins of the angle and magnitude for the current pixel being processed.

Redistribution

The redistribution 30 activities are split across a "Slab" generator and a "Block" accumulator. These activities are illustrated in FIG. 6, and described in the following two sub-sections. The notation "$b_{x,y}$" in FIG. 6 corresponds to a Brick in row x, column y.

In some embodiments, the Edge Filter 20 is merged together with the "Slab" generator to reduce traversals over individual pixels.

Slab Generation Filter

The output of the edge filter 20 is redistributed ("interpolated" in HoG terminology) across the angular bins. The first part of redistribution in the pipeline, which we call "genSlabs", takes a number of lines equal to the length of a brick side (for example, 4 lines) of each of the magnitudes and angles and outputs 1 line of histograms. Preferably there are 8 histogram of magnitude bins per Brick, although this could be set to any number.

"Slabs" are generated by adding each "Brick" histogram in a line into the previous "Brick" histogram. For example, in FIG. 6, the histogram of magnitude bins of the brick in row 'i' (where 'i' corresponds to a brick line in the current scale), column 2 is added to the histogram of magnitude bins for the brick in row 'i', column 1, and so on.

Each Slab (equivalent to half a Cell) comprises 8 histogram of magnitude bins, which is formed from the histogram of magnitude bins of 2 Bricks. Again, any number of histogram of magnitude bins may be chosen.

Note also that the Slabs represented are effectively overlapped by 1 "Brick" (strictly speaking, overlapped by 1 "Cell" minus 1 "Brick"), determined by the step size which the HoG detection window is being slid across the frame. Thus, the slab with histogram values "$b_{j,1}+j_{j,2}$" is layered upon "$b_{j+1,1}+b_{j+1,2}$" to form the first cell.

Blocks Generation Filter

The final part of redistribution in the pipeline, which we call the "genBlocks" filter accepts 4 lines of Slabs and outputs 2 lines of Blocks. A Block is simply an arrangement of 4 Cells, each Cell being compiled by summing two vertically aligned Slabs together, as illustrated in FIG. 6. In this case, each Cell comprises 8 histogram of magnitude bins, which are formed from the histogram of magnitude bins of 2 Slabs. Again, any number of histogram of magnitude bins may be chosen.

Due to the Slabs being originally effectively overlapped by one brick in the "genSlabs" filter plus the fact that a Block is two Cells wide, this produces Blocks which are now overlapping by three bricks (i.e. one Cell plus one Brick).

The histogram of magnitude bins in each Block is a concatenation of the histogram of magnitude bins in the Cells comprising the Blocks. That is, for each Cell, which comprises 8 histogram of magnitude bins, each Block comprises 32 histogram of magnitude bins i.e. the concatenation of the 4 Cells' worth of bins within the Block.

Whilst we describe a process in which the Bricks are redistributed into Slabs, and the Slabs are redistributed Cells, which are then concatenated into a Block's worth of histogram of magnitude bins, the process does not necessarily need to redistribute the bins into Cells prior to concatenation into Blocks.

In this situation, which goes from Bricks to Slabs to Blocks, 2 vertically adjacent Slabs (one on top of the other) are combined to give an 8 bin set of values, which are then concatenated with the 3 surrounding lots of 2 Slabs (i.e., the ones to the right, to the bottom, and to the bottom right).

Back to the generation of Blocks, a HoG feature requires that the Blocks overlap by only 1 Cell.

In the present invention, we exploit multiple plane handling present in hardware or in an underlying platform software framework, and output every second block to alternating planes—again, as illustrated in FIG. 6. This results in 1 line of blocks (overlapping by one cell) in each of two planes.

The advantage here is that the blocks in a row of a single feature window are now contiguous in memory, enabling vectorisation speed-ups through memory locality at the SVM classification stage later on.

Note also there is still interleaving of blocks in the vertical plane. Only the horizontal interleaving is eliminated by producing two planes. However, this does not produce any disadvantages at the SVM classification stage as only rows of Blocks need to be contiguous in memory rather than columns.

Note that lines 2-4 of the input slabs are cached and are used for the next iteration of the "genBlocks" filter along with a new line of Slabs.

As an alternative, the system may stride over the overlapped planes directly, and thus avoid the need for specific platform features at the cost of a small additional software processing overhead.

Partial 40 and Full 60 SVM Summation Filters

Feature windows are compiled by creating an array of floating point values directly derived from the overlapping blocks that reside within that feature window area. The blocks are overlapping by one cell in both the horizontal and vertical directions. In the case of a pedestrian feature window of dimension 64×128 pixels, for example, an input configuration of 7 blocks wide times 15 blocks high times 32 angular bins (where 32 angular bins come from 4 Cells of 8 bin histograms) will produce an array of 3360 elements (7\*15\*32).

In order to maintain the low processing power/memory footprint model, to employ as much caching as possible, and also to reduce the amount of expensive memory accesses, partial SVM results are calculated for each row and for each possible position of that row within a feature window.

A partial-SVM buffer 50 is statically allocated for the processing of each frame. This partial SVM buffer has a dimensional height (in blocks) equal to the feature window height and width (in Bricks) equal to the frame width. This allows for caching of all partially summed SVMs that can exist at any one time before a line of full SVMs is considered complete (by summation) and therefore frees up a partial SVM line for reuse The SVM filter accepts 2 lines of Blocks, performs a matrix multiply with all weights in each line of a feature window that the line of blocks can exist at. It then stores the resulting partial SVMs in the statically allocated buffer. For example, line 1 can only exist at line 1 of the feature window, whereas block line 2 can exist at either line 1 of the feature window OR line 2, and so on.

$$pSVM_i = [f^{11}\ f^{12}\ f^{13}\ f^{14}\ f^{21}\ f^{22}\ f^{23}\ f^{24}\ \cdots\ f^{c1}\ f^{c2}\ f^{c3}\ f^{c4}] \begin{bmatrix} w_i^{11} \\ w_i^{12} \\ w_i^{13} \\ w_i^{14} \\ w_i^{21} \\ w_i^{22} \\ w_i^{23} \\ w_i^{24} \\ \vdots \\ w_i^{c1} \\ w_i^{c2} \\ w_i^{c3} \\ w_i^{c4} \end{bmatrix}$$

The above illustrates partial and full SVM classification score calculation. The term "$f^{xy}$" corresponds to the feature ("Cell" histogram of magnitude bins) in "Block" row column x, cell y. The term "$w_i^{xy}$" corresponds to the trained feature weight for feature row i, "Block" row column x, "Cell" y.

$$SVM = \sum_{i=1}^{r} pSVM_i$$

The above illustrates how the full SVM for a particular feature is simply the summation of the individual partials. There may be many overlapping partials horizontally across an image, corresponding with different possible feature positions.

The above formulae both assume a feature of 'r' Block rows and 'c' Block columns.

Using the 64×128 pedestrian feature window dimensions as an example again, by the time that the 15th line of blocks has been presented, line one in the partial SVM buffer will contain the summation of the partial SVMs of the previous 15 lines of blocks and is now considered a complete SVM.

This line of full SVM classification scores is then output from the filter.

Note that the sizes presented above in terms of number of lines and widths correspond to one particular embodiment (4×4 pixel "Bricks", 8×8 pixel "Cells", 16×16 pixel "Blocks", 8 histogram magnitude bins per "Cell"). Other configurations are possible.

It is intended that the architectures and configurations depicted herein are merely exemplary, and that in fact many other configurations can be implemented which achieve the same desired functionality. Any two architectural components herein can potentially be combined with each other in different ways such that the desired functionality is still achieved.

Those skilled in the art will recognize that the boundaries between functional elements above are again merely illustrative, and various embodiments may reorder, rearrange, or combine the functional elements in altered ways. As a concrete example, the edge filter and slab filter can be combined to optimize image pixel traversal.

Fast Rejection Based on Partial SVM Calculations.

Whilst we have discussed the above example where the full SVM classification scores is output from the filter when the 15 lines of Blocks is present, we propose an improvement to this process in which only the SVM classification scores that exceed a configurable threshold (and thus are considered positive detections) are output. This significantly improves the detection speed of the process.

Consider a typical HoG-based pedestrian detector of 7 Brick-columns by 15-Brick rows. The present invention works row-by-row across the image, calculating and summating partial SVM scores. For the case of 15-Brick row detector, once 15 partials are added together, a complete SVM classification is yielded, and a classification is output. In general, for an n-brick row detector, once n partial SVMs are summed, a complete SVM classification is output.

Furthermore, consider the fact that, in a typical scene, most classifications are negative, that is, the spatial/scale sub-window being scanned does not usually contain the object of interest with it.

Pruning the search early within sub-windows potentially means avoiding the cost of calculating multiple SVM dot products, which are the most expensive operations within the HoG detection scheme.

Known approaches employ, for example, hierarchical multi-resolution cascades, where the same features are (computationally more cheaply) searched for at different (smaller) scales. Such approaches apply weak rejectors, i.e., only rejecting sub-windows from a subsequent higher scale if the score is significantly low such that it is not expected to score a positive at a higher scale.

By contrast, the improvement to the invention is to leverage the partial SVM calculation scheme we previously presented:

At training time, we generate a minimum partial SVM score across all rows of positive training images.

We also generate a maximum partial SVM score across all negative training images.

We then set a threshold value for any particular row to $$c * \frac{\max + \min}{2},$$

where c is a scaling constant to soften the rejector. These threshold values are stored in a table of one value per row.

Similar to weights, these thresholds are included with the firmware to provide real-time detections.

At run-time, we always calculate the partial SVM for the first row of an object. For each of the second and subsequent rows, we only calculate the partial SVM for that and subsequent rows if the partial sum to that point is greater than the threshold value for the previous row.

Furthermore, the threshold values in the table can be manually or automatically 'shaped' offline to handle cases where there is an uneven distribution of detection capability across the rows of a detector.

To exploit the natural numerical order of this table (i.e., where the most characteristic/more important edges of the object naturally lie), the system of the present invention will ensure that certain object searches will begin at the bottom of the input image, and work upwards row-by-row, whereas for others it will start from the top and work downwards row-by-row.

| Row# | Calculated | Stored Threshold |
|---|---|---|
| Row #1 | N/A | 0 |
| Row #2 | $pSVM_1$ | $c * \dfrac{\max row_0 + \min row_0}{2}$ |
| Row #3 | $\sum_{i=1}^{currentRow-1} pSVM_i$ | $\sum_{i=1}^{currentRow-1} c * \dfrac{\max row_i + \min row_i}{2}$ |
| ... | ... | ... |
| Row #15 | $\sum_{i=1}^{14} pSVM_i$ | $\sum_{i=1}^{14} c * \dfrac{\max row_i + \min row_i}{2}$ |

In the case of objects which have a different aspect ratio (i.e. width greater than height), the system of the current invention may transpose the input image (i.e., rotate by 90 degrees) prior to beginning processing. This is to ensure that there are more rows than columns in the detector, and thus to ensure maximum benefit from fast rejection based on partial SVM calculations.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. A method of determining the presence of objects in an image, comprising:
    receiving image pixel data comprising pixel values for a plurality of pixels in an image, where the image has x pixel rows and y pixel columns;
    applying an edge filter to the received image pixel data to generate angle and magnitude data for each pixel within the image;
    for each of n pixel rows by y pixel columns of the image, where n<x, redistributing the angle and magnitude data for the n pixel rows by y pixel columns to create a plurality of groups of histogram of magnitude bins across the width of the image;
    for each of m lots of n pixel rows of groups of histogram of magnitude bins, performing a partial Support Vector Machine (SVM) calculation based on the plurality of groups of histogram of magnitude bins, where m represents the number of n pixel rows in a Block of pixels;
    repeating the steps of redistribution and performing partial SVM calculations until there are j Block rows of partial SVM calculations, where j Block rows of pixels represents the number of Block rows of pixels in a feature window used to represent the object to be detected;
    performing a full SVM calculation using the j Block rows of partial SVM calculations to generate a histogram of oriented gradients (HOG) descriptor; and
    determining the presence of an object in the image based on the HOG descriptor.

2. The method according to claim 1, wherein redistributing the angle and magnitude data for the n pixel rows by y pixel columns comprises:
    redistributing the angle and magnitude data into a plurality of histogram of magnitude bins across the width of the image, each of the plurality of histogram of magnitude bins representing the histogram of magnitude bins of a Brick worth of pixels; and
    redistributing the plurality Brick histogram of magnitude bins into a plurality of Slab histogram of magnitude bins across the width of the image, where each Slab histogram of magnitude bins comprises the histogram of magnitude bins of two adjacent Brick worth of pixels in the same row.

3. The method according to claim 2, wherein each adjacent Slab worth of pixels in the same row of n pixel rows is overlapped with an adjacent Slab worth of pixel by a Brick worth of pixels.

4. The method according to claim 2, further comprising:
    redistributing the plurality of Slab histogram of magnitude bins into a plurality of Block histogram of magnitude bins across the width of the image, where each Block histogram of magnitude bins comprises a concatenation of the histogram of magnitude bins of eight Slabs in a 4×2 configuration, each Block comprising m lots of n pixel rows.

5. -A The method according to claim 4, wherein the concatenated histogram of magnitude bins comprises the concatenation of four groups of histogram of magnitude bins, each of the four groups of histogram of magnitude bins comprising a combination of the histogram of magnitude bins of two neighbouring Slabs within the eight Slabs in a 2x1 configuration.

6. The method according to claim 4, wherein redistributing the plurality Brick histogram of magnitude bins into a plurality of Slab histogram of magnitude bins across the width of the image comprises:
    generating two planes of a plurality of Slab histogram of magnitude bins across the width of the image, where a first plane comprises the histogram of magnitude bins of first set of neighbouring Brick worth of pixels in the same row, and a second plane comprises the histogram of magnitude bins of second set of neighbouring Brick worth of pixels in the same row, where the first plane and second plane are offset from each other by a Brick worth of pixels.

7. The method according to claim 6, wherein redistributing the plurality of Slab histogram of magnitude bins into a plurality of Cell histogram of magnitude bins across the width of the image comprises:
    redistributing the plurality of Slab histogram of magnitude bins of each plane into a plurality of Cell histogram of magnitude bins in each respective plane across the width of the image, where each Cell histogram of magnitude bins in each plane comprises the histogram of magnitude bins of four Slabs in a 2×2 in the respective plane, each Cell comprising 2n pixel rows.

8. The method according to claim 6, wherein arranging the plurality of Cell histogram of magnitude bins into a plurality of Block histogram of magnitude bins across the width of the image comprises:
    arranging the plurality of Cell histogram of magnitude bins of each plane into a plurality of Block histogram of magnitude bins in each respective plane across the width of the image by concatenating the histogram of magnitude bins of four Cells in each plane in a 2×2 configuration in the respective plane, each Block comprising m lots of n pixel rows.

9. The method according to claim 8, wherein performing a partial SVM calculation comprises performing the partial SVM calculation on each Block of pixels in each of the planes, and wherein performing a full SVM calculation using the j Block rows of partial SVM calculations to generate a HOG descriptor comprises performing a full SVM calculation using the partial SVM calculations in each of the planes.

10. The method according to claim 6, wherein redistributing the plurality of Slab histogram of magnitude bins into a plurality of Block histogram of magnitude bins across the width of the image comprises:
    redistributing the plurality of Slab histogram of magnitude bins of each plane into a plurality of Block histogram of magnitude bins in each plane across the width of the image, where each Block histogram of magnitude bins in each respective plane comprises a concatenation of the histogram of magnitude bins of eight Slabs in the respective plane in a 4×2 configuration, each Block comprising m lots of n pixel rows.

11. The method according to claim 10, wherein the concatenated histogram of magnitude bins comprises the concatenation of four groups of histogram of magnitude bins in each respective plane, each of the four groups of histogram of magnitude bins in each respective plane comprising a combination of the histogram of magnitude bins of two neighbouring Slabs within the eight Slabs in a 2×1 configuration.

12. The method according to claim 2, further comprising:
    redistributing the plurality of Slab histogram of magnitude bins into a plurality of Cell histogram of magnitude bins across the width of the image, where each Cell histogram of magnitude bins comprises the histogram of magnitude bins of four neighbouring Slabs in a 2×2 configuration, each Cell comprising 2n pixel rows.

13. The method according to claim 12, further comprising:
    arranging the plurality of Cell histogram of magnitude bins into a plurality of Block histogram of magnitude bins across the width of the image, where each Block histogram of magnitude bins comprises a concatenation of the histogram of magnitude bins of four neighbouring Cells in a 2×2 configuration, each Block comprising m lots of n pixel rows.

14. The method according to claim 1, wherein the partial SVM calculation is performed in the first m lot of n pixel rows, and subsequent partial SVM calculations for the remaining m lot of n pixel rows in the j Block rows are only performed if the calculated partial SVM value for the preceding m lot of n pixel rows is greater than a threshold value.

15. The method according to claim 14, wherein the threshold value is dependent on the position of the m lot of n pixel rows within the j Block rows of the feature window.

16. The method according to claim 14, wherein the threshold value is dependent on an average of a maximum and minimum partial SVM value for a m lot of n pixels rows.

17. The method according to claim 16, wherein the maximum partial SVM values are based on a maximum partial SVM value across a plurality of negative training images, and the minimum partial SVM values are based on a minimum partial SVM value across a plurality of positive training images.

18. A processor for determining the presence of objects in an image, comprising:
    an input for receiving image pixel data comprising pixel values for a plurality of pixels in an image, where the image has x pixel rows and y pixel columns; and
    an output for outputting a determination of the presence of an object in the image,
    wherein the processor is configured to:
        apply an edge filter to the received image pixel data to generate angle and magnitude data for each pixel within the image;
        for each of n pixel rows by y pixel columns of the image, where n<x, redistribute the angle and magnitude data for the n pixel rows by y pixel columns to create a plurality of groups of histogram of magnitude bins across the width of the image;
        for each of m lots of n pixel rows of groups of histogram of magnitude bins, perform a partial Support Vector Machine (SVM) calculation based on the plurality of groups of histogram of magnitude bins, where m represents the number of n pixel rows in a Block of pixels;
        repeat the steps of redistribution and performing partial SVM calculations until there are j Block rows of partial SVM calculations, where j Block rows of pixels represents the number of Block rows of pixels in a feature window used to represent the object to be detected;
        perform a full SVM calculation using the j Block rows of partial SVM calculations to generate a histogram of oriented gradients (HOG) descriptor;
        determine the presence of an object in the image based on the HOG descriptor; and
        output the determination of the presence of an object in the image.

19. The processor according to claim 18, wherein the processor is configured to redistribute the angle and magnitude data for the n pixel rows by y pixel columns by:
    redistributing the angle and magnitude data into a plurality of histogram of magnitude bins across the width of the image, each of the plurality of histogram of magnitude bins representing the histogram of magnitude bins of a Brick worth of pixels;
    redistributing the plurality Brick histogram of magnitude bins into a plurality of Slab histogram of magnitude bins across the width of the image, where each Slab histogram of magnitude bins comprises the histogram of magnitude bins of two adjacent Brick worth of pixels in the same row.

20. The processor according to claim 19, wherein each adjacent Slab worth of pixels in the same row of n pixel rows is overlapped with an adjacent Slab worth of pixel by a Brick worth of pixels.

21. The processor according to claim 19, wherein the processor is configured to:
    redistribute the plurality of Slab histogram of magnitude bins into a plurality of Block histogram of magnitude bins across the width of the image, where each Block histogram of magnitude bins comprises a concatenation of the histogram of magnitude bins of eight Slabs in a 4×2 configuration, each Block comprising m lots of n pixel rows.

22. The processor according to claim 21, wherein the concatenated histogram of magnitude bins comprises the concatenation of four histogram of magnitude bins, each of the four histogram of magnitude bins comprising a combination of the histogram of magnitude bins of two neighbouring Slabs within the eight Slabs in a 2×1 configuration.

23. The processor according to claim 21, wherein the processor is configured to redistribute the plurality Brick histogram of magnitude bins into a plurality of Slab histogram of magnitude bins across the width of the image by:
    generating two planes of a plurality of Slab histogram of magnitude bins across the width of the image, where a first plane comprises the histogram of magnitude bins of first set of neighbouring Brick worth of pixels in the same row, and a second plane comprises the histogram of magnitude bins of second set of neighbouring Brick worth of pixels in the same row, where the first plane and second plane are offset from each other by a Brick worth of pixels.

24. The processor according to claim 23, wherein the processor is configured to redistribute the plurality of Slab histogram of magnitude bins into a plurality of Cell histogram of magnitude bins across the width of the image by:
redistributing the plurality of Slab histogram of magnitude bins of each plane into a plurality of Cell histogram of magnitude bins in each respective plane across the width of the image, where each Cell histogram of magnitude bins in each plane comprises the histogram of magnitude bins of four Slabs in a 2×2 in the respective plane, each Cell comprising 2n pixel rows.

25. The processor according to claim 23, wherein the processor is configured to arrange the plurality of Cell histogram of magnitude bins into a plurality of Block histogram of magnitude bins across the width of the image by:
arranging the plurality of Cell histogram of magnitude bins of each plane into a plurality of Block histogram of magnitude bins in each respective plane across the width of the image by concatenating the histogram of magnitude bins of four Cells in each plane in a 2×2 configuration in the respective plane, each Block comprising m lots of n pixel rows.

26. The processor according to claim 25, wherein the processor is configured to perform a partial SVM calculation by performing the partial SVM calculation on each Block of pixels in each of the planes, and wherein the processor is configured to perform a full SVM calculation using the j Block rows of partial SVM calculations to generate a HOG descriptor by performing a full SVM calculation using the partial SVM calculations in each of the planes.

27. The processor according to claim 23, wherein the processor is configured to redistribute the plurality of Slab histogram of magnitude bins into a plurality of Block histogram of magnitude bins across the width of the image by:
redistributing the plurality of Slab histogram of magnitude bins of each plane into a plurality of Block histogram of magnitude bins in each plane across the width of the image, where each Block histogram of magnitude bins in each respective plane comprises a concatenation of the histogram of magnitude bins of eight Slabs in the respective plane in a 4×2 configuration, each Block comprising m lots of n pixel rows.

28. The processor according to claim 27, wherein the concatenated histogram of magnitude bins comprises the concatenation of four histogram of magnitude bins in each respective plane, each of the four histogram of magnitude bins in each respective plane comprising a combination of the histogram of magnitude bins of two neighbouring Slabs within the eight Slabs in a 2×1 configuration.

29. The processor according to claim 19, wherein the processor is configured to:
redistribute the plurality of Slab histogram of magnitude bins into a plurality of Cell histogram of magnitude bins across the width of the image, where each Cell histogram of magnitude bins comprises the histogram of magnitude bins of four neighbouring Slabs in a 2×2 configuration, each Cell comprising 2n pixel rows.

30. The processor according to claim 29, wherein the processor is configured to:
arrange the plurality of Cell histogram of magnitude bins into a plurality of Block histogram of magnitude bins across the width of the image, where each Block histogram of magnitude bins comprises a concatenation of the histogram of magnitude bins of four neighbouring Cells in a 2×2 configuration, each Block comprising m lots of n pixel rows.

31. The processor according to claim 18, wherein the processor is configured to perform the partial SVM calculation in the first m lot of n pixel rows, and subsequent partial SVM calculations for the remaining m lot of n pixel rows in the j Block rows are only performed if the calculated partial SVM value for the preceding m lot of n pixel rows is greater than a threshold value.

32. The processor according to claim 31, wherein the threshold value is dependent on the position of the m lot of n pixel rows within the j Block rows of the feature window.

33. The processor according to claim 31, wherein the threshold value is dependent on an average of a maximum and minimum partial SVM value for a m lot of n pixels rows.

34. The processor according to claim 33, wherein the maximum partial SVM values are based on a maximum partial SVM value across a plurality of negative training images, and the minimum partial SVM values are based on a minimum partial SVM value across a plurality of positive training images.

* * * * *